(12) United States Patent
Wang (10) Patent No.: US 9,584,654 B2
(45) Date of Patent: Feb. 28, 2017

(54) METHOD AND DEVICE FOR ADJUSTING CALL VOLUME, AND MOBILE TERMINAL

(71) Applicant: ZTE Corporation, Shenzhen, Guangdong (CN)

(72) Inventor: Shanhe Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/780,455

(22) PCT Filed: Aug. 28, 2013

(86) PCT No.: PCT/CN2013/082503
§ 371 (c)(1),
(2) Date: Sep. 25, 2015

(87) PCT Pub. No.: WO2013/189450
PCT Pub. Date: Dec. 27, 2013

(65) Prior Publication Data
US 2016/0057279 A1 Feb. 25, 2016

(30) Foreign Application Priority Data
May 22, 2013 (CN) .......................... 2013 1 0192212

(51) Int. Cl.
*H04M 3/00* (2006.01)
*H04M 1/725* (2006.01)
*H04M 1/60* (2006.01)

(52) U.S. Cl.
CPC ....... *H04M 1/72591* (2013.01); *H04M 1/6016* (2013.01); *H04M 1/72569* (2013.01); *H04M 2250/12* (2013.01)

(58) Field of Classification Search
CPC ..................... H04M 1/72591; H04M 1/72569; H04M 1/601; H04M 2250/12
(Continued)

(56) References Cited

U.S. PATENT DOCUMENTS

2012/0072206 A1 3/2012 Tsuchinaga
2013/0094668 A1 4/2013 Poulsen
(Continued)

FOREIGN PATENT DOCUMENTS

| CN | 101902526 A | 12/2010 |
|----|-------------|---------|
| CN | 101968710 A | 2/2011 |
| EP | 2582045 A1 | 4/2013 |

OTHER PUBLICATIONS

International Search Report in international application No. PCT/CN2013/082503, mailed on Feb. 27, 2014.
(Continued)

*Primary Examiner* — Amancio Gonzalez
(74) *Attorney, Agent, or Firm* — Oppedahl Patent Law Firm LLC (57) ABSTRACT

Provided are a method and device for adjusting a call volume and a mobile terminal, wherein the method includes detecting gravity location information of a terminal when a given detection time is reached, and adjusting a current call volume in accordance with a given volume adjustment rule when the gravity location information and gravity location information obtained by last detection are separately located on two sides of a pre-set gravity zero line. The application of the present disclosure solves a problem in the related art that a user in a call using a left ear and a right ear alternatively usually needs to continuously adjust volume of an earphone manually because there is a hearing difference between the left ear and the right ear, which results in much inconvenience when answering a call, and thus the call volume during a call can be automatically adjusted, a performance of the mobile terminal is enhanced and user experience is improved.

20 Claims, 4 Drawing Sheets

(58) Field of Classification Search
 USPC .......................................................... 455/418
 See application file for complete search history.

(56) References Cited

U.S. PATENT DOCUMENTS

2013/0095886 A1* 4/2013 Hong ................ H04M 1/72519
 455/556.1
2015/0119109 A1* 4/2015 Sudo ..................... H04R 7/045
 455/566

OTHER PUBLICATIONS

English Translation of the Written Opinion of the International Search Authority in international application No. PCT/CN2013/082503, mailed on Feb. 27, 2014.
Supplementary European Search Report in European application No. 13807305.1, mailed on Apr. 5, 2016.

\* cited by examiner

| Wireless and network |
| --- |
| Call setting |
| Voice |
| Display |
| Location and safety |
| Applications |
| Account and synchronization |
| ... ... |
| |

Fig. 12

| Other call setting |
| --- |
| One-touch dialing |
| Call barring setting |
| Call transfer |
| Other setting |
| Network call setting |
| Account |
| Make calls on the Internet |
| ... ... |

METHOD AND DEVICE FOR ADJUSTING CALL VOLUME, AND MOBILE TERMINAL

TECHNICAL FIELD

The present disclosure relates to the field of mobile communications, and particularly relates to a method and device for adjusting call volume, and a mobile terminal.

BACKGROUND

In scientific discovery, there is a difference between hearing of a left ear and a right ear of each person, particularly some people suffered from an ear disease may have a big binaural hearing difference. A foreign hearing survey in 1998 shows approximately 1 percent of children at school suffer from one-side hearing loss. A survey by *Chinese Journal of Pediatrics* in 2009 shows that a hearing loss rate of middle school students in Xi'an is 2.30%. According to statistics, there are approximately 27.8 million of people with hearing impairment currently in our country, which occupy the maximum amount among various disabled people. In addition, influenced by air pollution, noise, frequent use of an earphone to listen to a music, and the like, the amount of people with hearing impairment is increasing.

For users having a hearing difference between a left ear and a right ear, there is much inconvenience when they answer a call. When calling for a long time, they may feel uncomfortable if answering the call on one side for a much longer time, and thus generally may answer the call with the left ear and the right ear alternatively; in this situation, if an earphone volume is unchanged, the users may feel that the voice is too loud or too low. When they frequently transfer the phone between the left ear and the right ear, they need to continuously adjust the volume, which may influence their mood when calling, and thus they feel unsatisfied with a mobile phone. In addition, a left half and a right half of a brain may have different ways to process the sound, and therefore when the sound is heard, two ears may adopt different ways for processing. The left ear is most sensitive to a music, while the right ear may obtain a voice better.

When a left ear and a right ear of a user is alternatively used in a call, since hearing of the left ear and the right ear is different, the user usually needs to continuously adjust volume of an earphone manually, which results in much inconvenience when answering the call.

SUMMARY

The present disclosure provides a method and device for adjusting a call volume, and a mobile terminal, to solve a problem in the related art that a user in a call cannot self-adaptively adjust a call volume, which results in much inconvenience when answering a call.

In order to solve the above technical problem, in one aspect, the present disclosure provides a method for adjusting a call volume, which may include the following steps of performing detection for gravity location information of a terminal when a given detection time is reached, and adjusting a current call volume in accordance with a given volume adjustment rule when the gravity location information and gravity location information obtained by last detection are separately located on two sides of a pre-set gravity zero line.

Preferably, the method further may further include: before adjusting the current call volume in accordance with the given volume adjustment rule, judging whether a distance between the terminal and a user's head exceeds a pre-set distance threshold in a period of time from last detection time to this detection time, and adjusting the call volume of the terminal in a situation that the distance exceeds the pre-set distance threshold.

Preferably, the two sides of the gravity zero line may include a left-side area and a right-side area of the gravity zero line, wherein values in the left-side area and the right-side area are not positive simultaneously, or values in the left-side area and the right-side area are not negative simultaneously.

Preferably, adjusting the current call volume in accordance with the given volume adjustment rule when the gravity location information and the gravity location information obtained by the last detection are separately located on two sides of the pre-set gravity zero line, may include: adjusting the current call volume to a call volume corresponding to the right-side area when the gravity location information is changed from the left-side area to the right-side area; and adjusting the current call volume to a call volume corresponding to the left-side area when the gravity location information is changed from the right-side area to the left-side area.

Preferably, the method may further include: after detecting the gravity location information of the terminal when the given detection time is reached, setting a timing time T when the gravity location information is located at the gravity zero line, and detecting the gravity location information again when the timing time T is reached; wherein, the timing time T is less than the detection time.

In another aspect, the present disclosure further provides a device for adjusting a call volume, which may include: a detection module configured to perform detection for gravity location information of a terminal when a given detection time is reached; and a volume control module configured to adjust current call volume in accordance with a given volume adjustment rule when the gravity location information and gravity location information obtained by last detection are separately located on two sides of a pre-set gravity zero line.

Preferably, the device may further include a judgement module configured to judge whether a distance between the terminal and a user's head exceeds a pre-set distance threshold in a period of time from last detection time to this detection time; and the volume control module may be configured to adjust the call volume of the terminal in a situation that the distance exceeds the pre-set distance threshold.

Preferably, the volume control module may include a first volume control unit configured to adjust the current call volume to a call volume corresponding to the right-side area when the gravity location information is changed from the left-side area to the right-side area of the gravity zero line, and a second volume control unit configured to adjust the current call volume to a call volume corresponding to the left-side area, when the gravity location information is changed from the right-side area to the left-side area.

Preferably, the device may further include an execution module configured to set a timing time T when the gravity location information is located at the gravity zero line, and detect the gravity location information again when the timing time T is reached; wherein, the timing time T is less than the detection time.

Further in another aspect, the present disclosure further provides a mobile terminal, which may include any device for adjusting a call volume described above.

The present disclosure monitors the change of gravity location information of a mobile terminal to judge whether the gravity location information passes a pre-set gravity zero line during a changing procedure; in a situation that the gravity location information passes the pre-set gravity zero line, if it is determined that the mobile terminal is transferred between the left ear and the right ear, then the current call volume is adjusted to another volume. It can be seen that the present disclosure can automatically adjust the call volume during calling, enhance a performance of the mobile terminal, improve user experience, and solve the problem well in the related art that a user in a call who alternatively uses the left ear and the right ear usually needs to continuously adjust the volume of an earphone manually due to the hearing difference between the left ear and the right ear, which results in much inconvenience when answering the call.

DETAILED DESCRIPTION

In order to solve a problem in the related art that a user in a call usually needs to continuously adjust the volume of an earphone manually and cannot implement self-adaptive volume adjustment, which results in much inconvenience when answering the call, embodiments of the present disclosure provide a method and device for adjusting a call volume, and a mobile terminal. The present disclosure is further explained in detail below in combination with the accompanied drawings. It shall be understood that the specific embodiments described here are only used to interpret the present disclosure, and are not used to limit the present disclosure.

Figure 1:
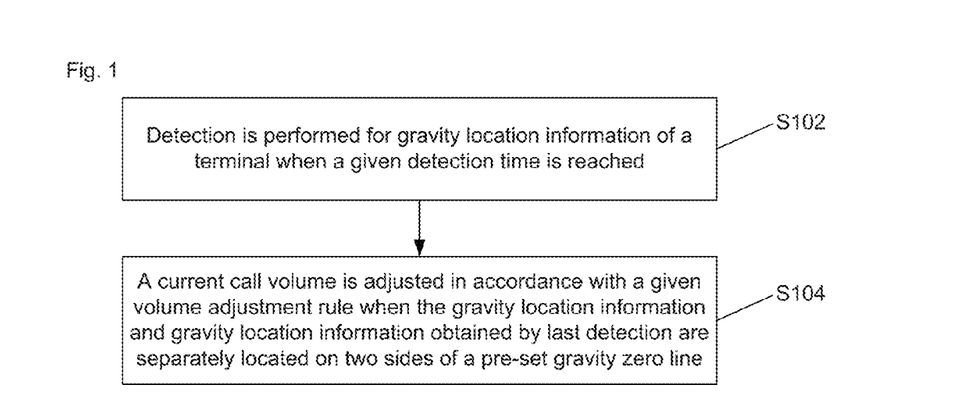
FIG. 1 is a flowchart of a method for adjusting a call volume in an embodiment of the present disclosure.

A flow of a method for adjusting a call volume which is provided by this embodiment may be shown in FIG. 1, and may include steps S102 to S104.

Step S102 includes that detection is performed for gravity location information of a terminal when a given detection time is reached.

Step S104 includes that a current call volume is adjusted in accordance with a given volume adjustment rule when the gravity location information and gravity location information obtained by last detection are separately located on two sides of a pre-set gravity zero line.

The gravity zero line here is a middle division line when the mobile terminal is in a vertical state, and the gravity location information is a plumb line passing the barycentre of the mobile terminal along a gravity direction.

In this embodiment, the change of the gravity location information of the mobile terminal is detected, and when it is shown that the gravity location information is located on a different side of the gravity zero line if compared with the gravity location information in the last detection, it is determined that the mobile terminal is transferred between a left ear and a right ear, and then the current call volume is adjusted to another volume.

It can be seen that this embodiment can automatically adjust the call volume during calling, enhances a performance of the mobile terminal, improves user experience, and solves a problem well in the related art that a user in a call alternatively using a left ear and a right ear usually needs to continuously adjust the volume of an earphone manually because hearing of the left ear and the right ear is different, which results in much inconvenience when answering the call.

Before detection, a left area and a right area of the gravity zero line, namely two areas including the left area and the right area, may be divided separately, and when a detection time is reached, whether the gravity location information and the gravity location information obtained by last detection are separately located on two sides of a pre-set gravity zero line is detected.

When the gravity location information of the mobile terminal inducts that gravity of the mobile terminal is changed from the left-side area to the right-side area, the current call volume is adjusted to a call volume corresponding to the right-side area; or when the gravity location information of the mobile terminal is changed from the right-side area to the left-side area, the current call volume is adjusted to a call volume corresponding to the left-side area.

When setting is performed, values may be assigned to the left-side area and the right-side area of the mobile terminal, for example, in the left-side area, the detected gravity location information is positive, and when a barycenter is changed from left to right, the gravity location information is changed to a negative, then it is simple by this method to determine the area where the barycenter of the mobile terminal is located, and then how to adjust the call volume is determined accordingly. When setting is performed, it should be noted that in order to show a difference between the left-side area and the right-side area, the values of the left-side area and the right-side area may not be positive or negative simultaneously; of course, an interval may also be set, for example a value range of the left-side area is [1,2], and the value range of the right-side area is [2,3], the value of the detected gravity location information is judged to determine which area the barycenter is located in, at this time the value corresponding to the gravity zero line is 2.

During implementation of the above method, some misjudgement may be caused due to an excessive big change of postures of the user in a call, for example, the transfer between the left ear and the right ear does not occur, but the call volume is adjusted, therefore before the call volume is adjusted, whether a distance between the mobile terminal and a user's head exceeds a pre-set distance threshold is determined, and if the pre-set distance threshold is exceeded, then the call volume is adjusted. During implementation, the distance between the mobile terminal and the user's head may be detected through a distance detector; when the distance between the mobile terminal and the user's head exceeds the pre-set distance threshold, a screen of the mobile terminal may be lightened; when it is further determined that the mobile terminal is transferred between the left ear and the right ear, the call volume is then adjusted, which avoids a problem brought by misoperation.

When detection is performed for the gravity location information of the mobile terminal, there is also a situation that at a detection time point, the gravity location information is just located at the gravity zero line, at this moment, the call volume of the mobile terminal is not adjusted; a timing time T is set, and when the time T is reached, the gravity location information is detected again. In this embodiment, the time T is set to be smaller than a detection time, of course, other setting may also be performed according to a requirement.

Figure 2:
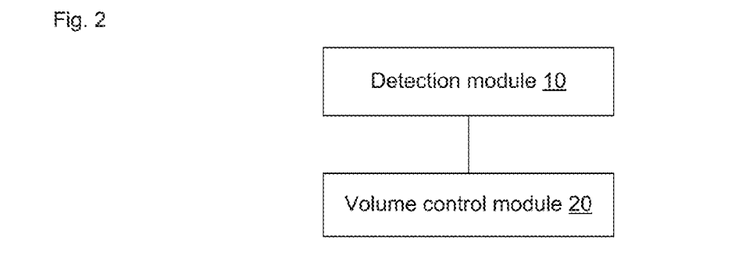
FIG. 2 is a structure schematic diagram of a first device for adjusting a call volume in an embodiment of the present disclosure.

A structure of a device for adjusting a call volume provided by this embodiment may be shown in FIG. 2, which includes: a detection module 10 configured to detect gravity location information of a terminal when a given detection time is reached; a volume control module 20 coupled with the detection module 10 and configured to adjust the current call volume in accordance with a given volume adjustment rule when the gravity location information and gravity location information obtained by last detection are separately located on two sides of a pre-set gravity zero line.

Figure 3:
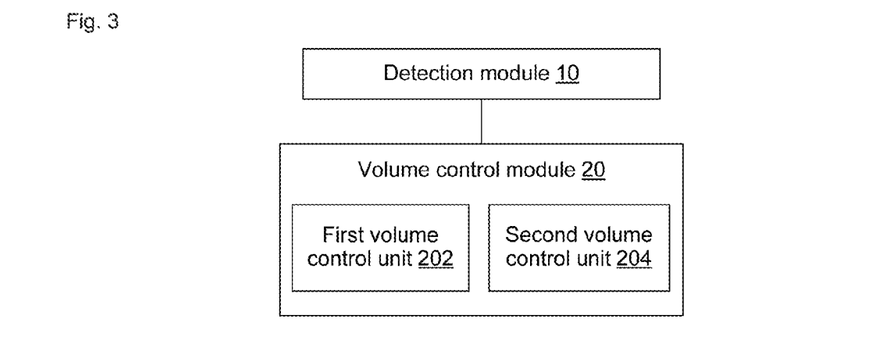
FIG. 3 is a structure schematic diagram of a second device for adjusting a call volume in an embodiment of the present disclosure.

During implementation, a function of the above device may further be detailed to be set in a form of dependent unit, then the structure of the above device may be shown in FIG. 3. Based on the device shown in FIG. 2, the volume control module 20 includes: a first volume control unit 202 configured to adjust a call volume corresponding to the left-side area to a call volume corresponding to the right-side area when the gravity location information is change from the left-side area to the right-side area; a second volume control unit 204 configured to adjust a call volume corresponding to the right-side area to a call volume corresponding to the left-side area when the gravity location information is changed from the right-side area to the left-side area.

Figure 4:
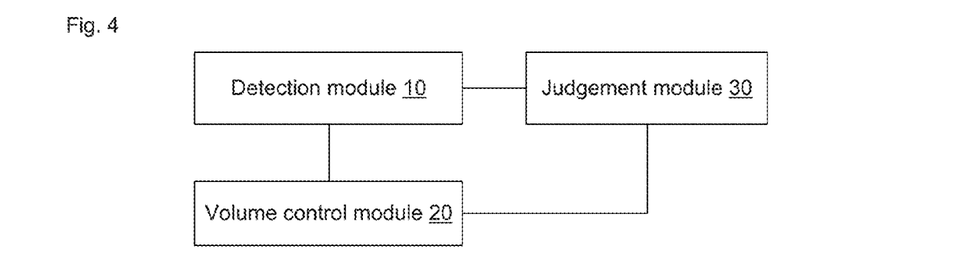
FIG. 4 is a structure schematic diagram of a third device for adjusting a call volume in an embodiment of the present disclosure.

In order to further improve accuracy of volume adjustment during calling and to avoid misoperation, the above device may further be shown in FIG. 4; based on the device shown in FIG. 2, this device further includes a judgment module 30 coupled with the detection module 10 and the volume control module 20 and configured to judge whether the distance between the terminal and the user's head exceeds a pre-set distance threshold in a time interval from an last detection time to this detection time; the volume control module 20 is configured to adjust the call volume of the terminal in a situation that the pre-set distance threshold is exceeded.

Figure 5:
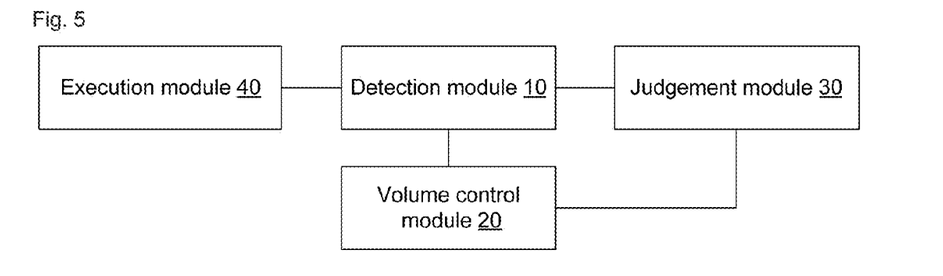
FIG. 5 is a structure schematic diagram of a forth device for adjusting a call volume in an embodiment of the present disclosure.

During implementation of the above device, the gravity location information detected at a detection time point may be just located at the gravity zero line; in order to avoid a problem that the above device cannot adjust the call volume in this situation, the above device may further be optimized, an optimized structure schematic diagram is shown in FIG. 5; based on the device shown in FIG. 4, this device further includes:

an execution module 40 coupled with the detection module 10 and configured to set a timing time T when the gravity location information is located at the gravity zero line, and to detect the gravity location information again when the time T is reached, wherein the time T is smaller than the detection time.

The above detection module may be implemented by a gyroscope or a gravity inductor or the like in a mobile phone; the judgment module, the volume control module and the execution module may all be implemented by a CPU chip.

The above device for adjusting a call volume may be set in the mobile terminal, for example, the above device is set in a panel computer, a mobile phone, and etc.

Preferred Embodiment

Currently, mobile phones become more and more humanized, various functional applications are also very rich, and a humanized design seems very important. Since the left ear is most sensitive to music, while the right ear may obtain voice better, therefore when a call is answered on a left side and a right side, it is necessary to distinguish the volume.

Figure 6:
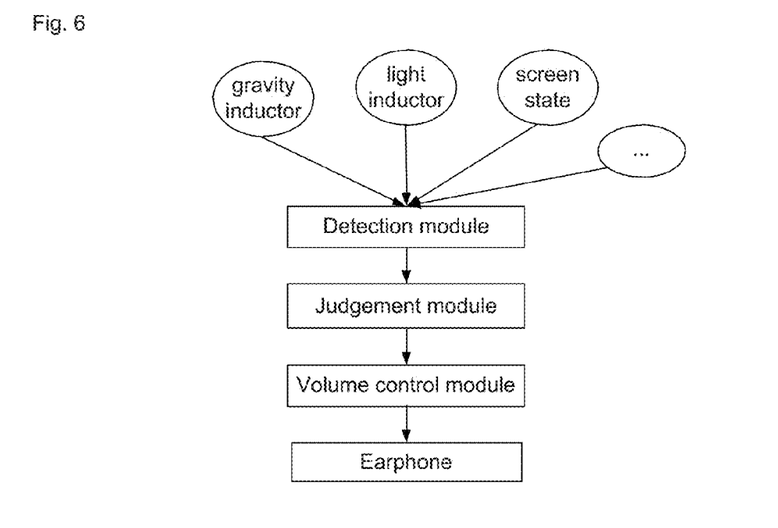
FIG. 6 is a schematic diagram of the internal architecture of a mobile phone where a call volume can be adjusted in a preferred embodiment of the present disclosure.

A mobile phone provided by this embodiment includes a detection module, a judgement module, an execution module, and a volume control module, of which the setting in the mobile phone may be shown in FIG. 6.

The detection module is configured to receive various information of the mobile phone collected by an equipment and existing in the mobile phone, for example, the information collected by a gravity inductor, a light inductor and screen brightness and other collected information, so as to determine how to perform a volume control; when it is determined that the mobile phone inclines according to the above information, the above information is transmitted to the judgement module;

the judgment module is configured to judge whether a distance between the mobile phone in which the judgement module is located and a user's head exceeds a pre-set distance threshold, and when it is determined that the distance between the mobile phone and the user's head exceeds the pre-set distance threshold and when location change of the mobile phone between the left ear and the right ear happens, a processing result is delivered to the volume control module; and the volume control module is configured to determine to adjust the earphone volume of the mobile phone which is transferred between the left ear and the right ear according to the processing result delivered by the judgment module.

The above detection module may be implemented by the gyroscope or the gravity inductor or the like in the mobile phone; both the judgment module and the volume control module may be implemented by a CPU chip.

This embodiment emphasizes the employment of information about a mobile phone screen state (for example, screen brightness) and the gravity inductor, and judges upon the processing of the information whether the user answers a call using the left ear or the right ear, and then adjusts the earphone volume according to a pre-set mode.

Explanation is given below by taking the above mobile phone which automatically adjusts the earphone volume by virtue of the information about a mobile phone screen state and the gravity inductor.

Figure 7:
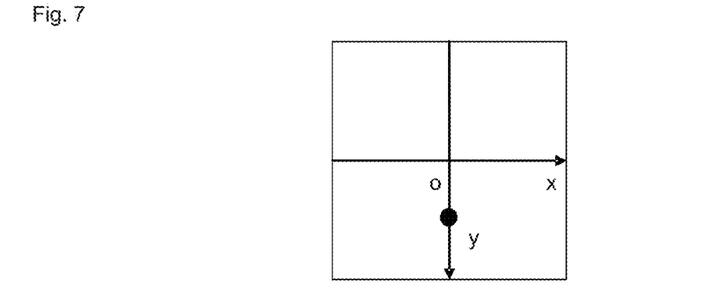
FIG. 7 is a gravity induction principle view in a preferred embodiment of the present disclosure.
Figure 8:
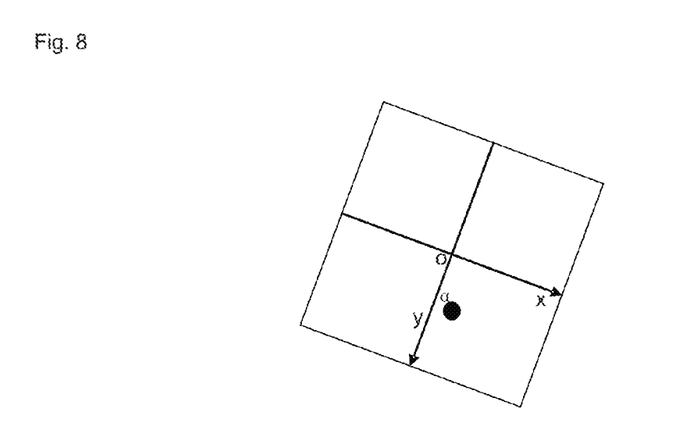
FIG. 8 is another gravity induction principle view in a preferred embodiment of the present disclosure.

The gravity inductor measures voltage values of a piece of internal weight, which is integrated with a piezoelectric plate, in two orthogonal directions, and then may convert a voltage into a component by virtue of piezoelectric effect, and then an inclination angel of the mobile phone may be determined upon simple geometric knowledge and according to the values of two component forces; as shown in FIG. 7, when a location of the mobile phone is in a vertical status, a gravity induction direction of the mobile phone may be changed. When we are answering a call on the left side, the mobile phone is inclined towards the left; on the contrary, the mobile phone is inclined towards the right. Which ear the user is using to answer the call may then be detected according to the inclined direction of the mobile phone.

Figure 9:
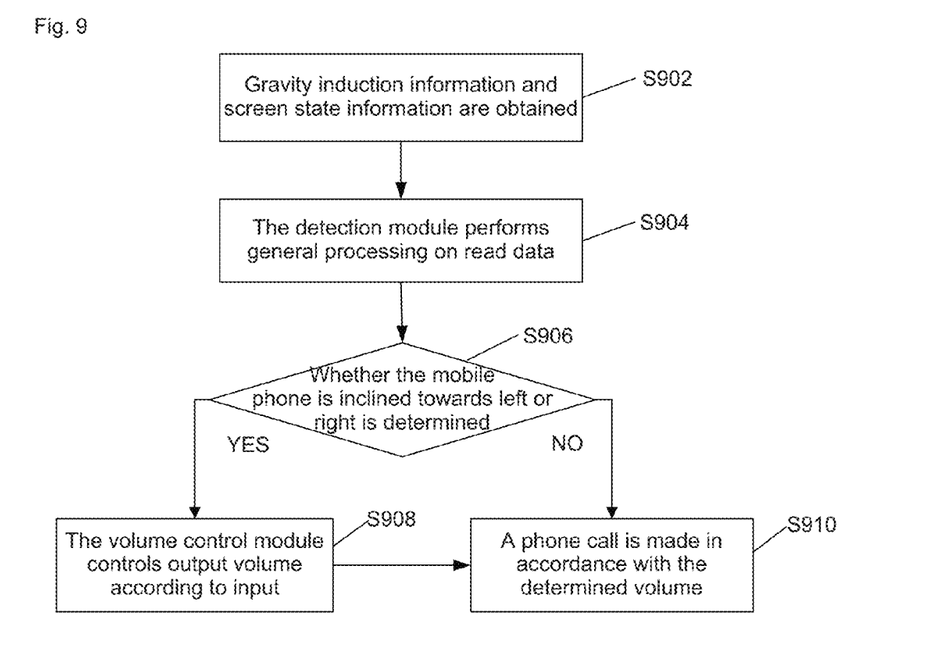
FIG. 9 is a flowchart of a method for judging the inclination direction of a mobile phone in a preferred embodiment of the present disclosure.

The method of judging an inclined direction of the mobile phone is explained below, as shown in FIG. 9.

Step S902 includes that gravity induction information and screen state information are obtained.

During the implementation, perception may be obtained by a gravity inductor and a screen sensor already existing in the mobile phone.

A process of obtaining a parameter in this step is obtaining after dialing or answering a call the gravity location information, information indicating that the mobile phone goes close to a face, and etc., for example, the time t when a screen becomes black; and simultaneously the component forces (x, y) of a weight on two coordinate axes in the gravity sensor at this time point t are read by the detection module.

Step S904 includes that the detection module performs general processing on read data to obtain data which can be transmitted.

Step S906 includes that whether the mobile phone is inclined towards left or right is determined according to processed gravity location information; if the gravity location information and the gravity location information obtained by last detection are separately located at two sides of the pre-set gravity zero line, it is determined that the mobile phone is inclined left or right, then Step S908 is executed; if left inclination or right inclination is not determined, then Step S910 is executed.

Step S908 includes that the volume control module controls output volume according to input.

Step S910 includes that a phone call is made in accordance with the determined volume.

Figure 10:
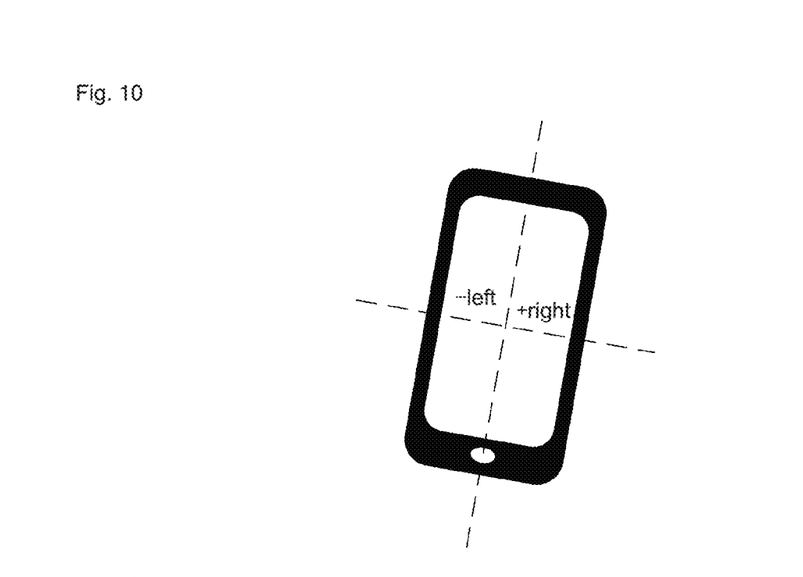
FIG. 10 is a schematic diagram of a method for judging inclination of a mobile phone in a preferred embodiment of the present disclosure.

During execution from S906 to S910, after it is determined that the above data is received, the inclination direction of the mobile phone is determined using a coordinate parameter. For example, when x is larger than zero, it is set to represent that the mobile phone is inclined right, as shown in FIG. 10, and it may indicate that at this moment the user is answering the call with the right ear. On the contrary, if it is detected that x is smaller than 0, then it may be determined that the call is answered with the left ear. If x=0, it is indicated that the mobile phone is in a vertical state, the execution module is called to obtain a new coordinate to make a judgement when the time is t+0.1s, and will not stop until a determination is made; in a period when which ear is used to listen to the call is not yet determined, the volume control module is not called, and the volume is output in a normal mode.

Figure 11:
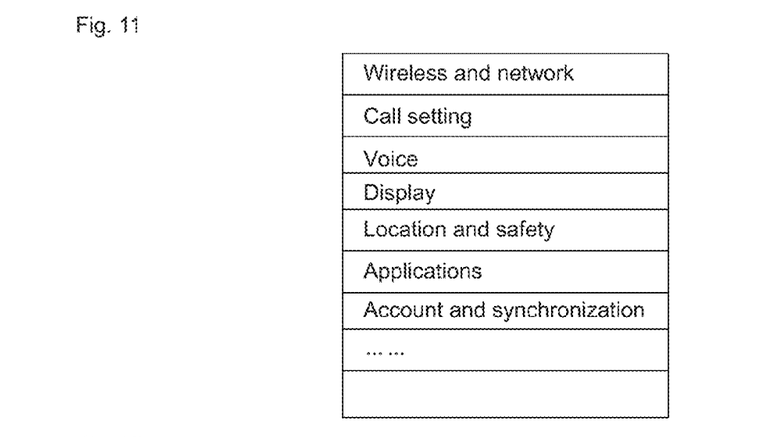
FIG. 11 is a schematic diagram of the interface setting of a mobile phone in a preferred embodiment of the present disclosure.
Figure 12:
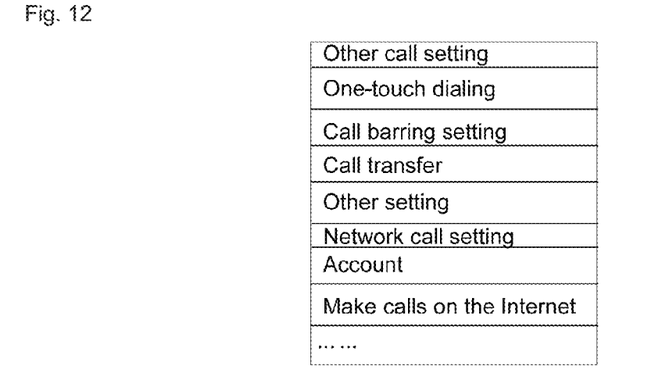
FIG. 12 is a schematic diagram of another interface setting of a mobile phone in a preferred embodiment of the present disclosure.

After determining the ear with which the user is listening to the call, the detection module delivers a determination result to the volume control module, this module controls the volume of the earphone through the received information and according to a pre-set mode. The pre-set volumes on left and right ear sides may be set in advance in a call setting by the user, for example, pre-setting is performed under call setting shown in FIG. 11, in which scenario after the call setting is accessed, automatic earphone volume adjustment may be displayed directly; the automatic earphone volume adjustment may also be set by accessing other setting in a menu under the call setting shown in FIG. 12. To this end, the first judgment made in answering of a call has been completed.

During a call, the posture of the user may be changed at any time. In order to accurately identify the change of inclination direction of the mobile phone is caused by user's active transfer of the mobile phone from one side to another side to answer the call or caused by the change of the posture of the user, the judgment module is called at this moment to determine whether the distance between the mobile phone and the user's head exceeds a pre-set distance threshold, and after it is determined that the detected distance exceeds the pre-set distance, it is determined that the user actively transfers the phone from one side to the other side for answering the call, during this process the screen may be lightened.

The detection module may judge again whether the mobile phone is inclined towards left or right after the screen changed to black from lightened. In this way, when the user changes a posture (for example, lowering the head) which causes the mobile phone to incline towards an opposite direction, the mobile phone is always beside the ear, the screen may not be lightened, therefore misjudgement may not occur. When the user actively transfers the mobile phone to the other side to answer the call, the earphone may gradually leave a face and then approach the face, during this process, the screen may be lightened one time, in this way a chance of misjudgement may greatly be reduced.

Although for a purpose of exemplification, a preferred embodiment of the present disclosure has already been disclosed, those skilled in the art will also be probably conscious of various improvements, additions and substitutions, therefore, the scope of the present disclosure shall not be limited to the above embodiments.

What is claimed is:

1. A method for adjusting a call volume, comprising:
   performing detection for gravity location information of a terminal when a given detection time is reached, wherein the gravity location information is a plumb line passing a barycentre of the terminal along a gravity direction; and
   adjusting a current call volume in accordance with a given volume adjustment rule when the gravity location information and gravity location information obtained by last detection are separately located on two sides of a pre-set gravity zero line, wherein the pre-set gravity zero line is a middle division line when the terminal is in a vertical state.

2. The method according to claim 1, further comprising: before adjusting the current call volume in accordance with the given volume adjustment rule,
   judging whether a distance between the terminal and a user's head exceeds a pre-set distance threshold in a period of time from last detection time to this detection time, and adjusting the call volume of the terminal in a situation that the distance exceeds the pre-set distance threshold.

3. The method according to claim 1, wherein the two sides of the gravity zero line comprise a left-side area and a right-side area of the gravity zero line, wherein values in the left-side area and the right-side area are not positive simultaneously, or values in the left-side area and the right-side area are not negative simultaneously.

4. The method according to claim 3, wherein adjusting the current call volume in accordance with the given volume adjustment rule when the gravity location information and the gravity location information obtained by the last detection are separately located on the two sides of the pre-set gravity zero line comprises:
- adjusting the current call volume to a call volume corresponding to the right-side area when the gravity location information is changed from the left-side area to the right-side area; and
- adjusting the current call volume to a call volume corresponding to the left-side area when the gravity location information is changed from the right-side area to the left-side area.

5. The method according to claim 1, further comprising: after detecting the gravity location information of the terminal when the given detection time is reached,
- setting a timing time T when the gravity location information is located at the gravity zero line, and detecting the gravity location information again when the timing time T is reached; wherein, the timing time T is less than the detection time.

6. A device for adjusting a call volume, comprising a detection module and a volume control module; wherein
- the detection module is configured to perform detection for gravity location information of a terminal when a given detection time is reached, wherein the gravity location information is a plumb line passing a barvcentre of the terminal along a gravity direction; and
- the volume control module is configured to adjust a current call volume in accordance with a given volume adjustment rule when the gravity location information and gravity location information obtained by last detection are separately located on two sides of a pre-set gravity zero line, wherein the pre-set gravity zero line is a middle division line when the terminal is in a vertical state.

7. The device according to claim 6, further comprising a judgement module configured to judge whether a distance between the terminal and a user's head exceeds a pre-set distance threshold in a period of time from last detection time to this detection time;
- correspondingly, the volume control module is configured to adjust the call volume of the terminal in a situation that the distance exceeds the pre-set distance threshold.

8. The device according to claim 6, wherein the volume control module comprises:
- a first volume control unit configured to adjust the current call volume to a call volume corresponding to aright-side area when the gravity location information is changed from a left-side area to the right-side area of the gravity zero line; and
- a second volume control unit configured to adjust the current call volume to a call volume corresponding to the left-side area when the gravity location information is changed from the right-side area to the left-side area.

9. The device according to claim 6, further comprising an execution module configured to set a timing time T when the gravity location information is located at the gravity zero line, and detect the gravity location information again when the timing time T is reached; wherein, the timing time T is less than the detection time.

10. A mobile terminal comprising a device which comprises a detection module configured to perform detection for gravity location information of a terminal when a given detection time is reached, wherein the gravity location information is a plumb line passing a barycentre of the terminal along a gravity direction, and a volume control module configured to adjust a current call volume in accordance with a given volume adjustment rule when the gravity location information and gravity location information obtained by last detection are separately located on two sides of a pre-set gravity zero line, wherein the pre-set gravity zero line is a middle division line when the terminal is in a vertical state.

11. The method according to claim 2, wherein the two sides of the gravity zero line comprise a left-side area and a right-side area of the gravity zero line, wherein values in the left-side area and the right-side area are not positive simultaneously, or values in the left-side area and the right-side area are not negative simultaneously.

12. The method according to claim 11, wherein adjusting the current call volume in accordance with the given volume adjustment rule when the gravity location information and the gravity location information obtained by the last detection are separately located on the two sides of the pre-set gravity zero line comprises:
- adjusting the current call volume to a call volume corresponding to the right-side area when the gravity location information is changed from the left-side area to the right-side area; and
- adjusting the current call volume to a call volume corresponding to the left-side area when the gravity location information is changed from the right-side area to the left-side area.

13. The method according to claim 2, further comprising: after detecting the gravity location information of the terminal when the given detection time is reached,
- setting a timing time T when the gravity location information is located at the gravity zero line, and detecting the gravity location information again when the timing time T is reached; wherein, the timing time T is less than the detection time.

14. The device according to claim 7, wherein the volume control module comprises:
- a first volume control unit configured to adjust the current call volume to a call volume corresponding to aright-side area when the gravity location information is changed from a left-side area to the right-side area of the gravity zero line; and
- a second volume control unit configured to adjust the current call volume to a call volume corresponding to the left-side area when the gravity location information is changed from the right-side area to the left-side area.

15. The device according to claim 7, further comprising an execution module configured to set a timing time T when the gravity location information is located at the gravity zero line, and detect the gravity location information again when the timing time T is reached; wherein, the timing time T is less than the detection time.

16. The mobile terminal according to claim 10, wherein the device further comprises a judgement module configured to judge whether a distance between the terminal and a user's head exceeds a pre-set distance threshold in a period of time from last detection time to this detection time;
- correspondingly, the volume control module is configured to adjust the call volume of the terminal in a situation that the distance exceeds the pre-set distance threshold.

17. The mobile terminal according to claim 10, wherein the volume control module comprises:
- a first volume control unit configured to adjust the current call volume to a call volume corresponding to aright-side area when the gravity location information is changed from a left-side area to the right-side area of the gravity zero line; and a second volume control unit configured to adjust the current call volume to a call volume corresponding to the left-side area when the gravity location information is changed from the right-side area to the left-side area.

18. The mobile terminal according to claim 10, wherein the device further comprises an execution module configured to set a timing time T when the gravity location information is located at the gravity zero line, and detect the gravity location information again when the timing time T is reached; wherein, the timing time T is less than the detection time.

19. The mobile terminal according to claim 16, wherein the volume control module comprises:

a first volume control unit configured to adjust the current call volume to a call volume corresponding to aright-side area when the gravity location information is changed from a left-side area to the right-side area of the gravity zero line; and a second volume control unit configured to adjust the current call volume to a call volume corresponding to the left-side area when the gravity location information is changed from the right-side area to the left-side area.

20. The mobile terminal according to claim 16, wherein the device further comprises an execution module configured to set a timing time T when the gravity location information is located at the gravity zero line, and detect the gravity location information again when the timing time T is reached; wherein, the timing time T is less than the detection time.

* * * * *